(No Model.) 2 Sheets—Sheet 1.

G. P. BOSWORTH.
STOP MOTION FOR SPOOLING MACHINES.

No. 575,663. Patented Jan. 19, 1897.

Witnesses. Inventor.
Charles Hannigan. George P. Bosworth
James W. Brennan by S. Scholfield
Atty.

(No Model.) 2 Sheets—Sheet 2.

G. P. BOSWORTH.
STOP MOTION FOR SPOOLING MACHINES.

No. 575,663. Patented Jan. 19, 1897.

Witnesses: Inventor:
Charles Hannigan. George P. Bosworth
James W. Beaman. by J. Scholfield
Atty.

UNITED STATES PATENT OFFICE.

GEORGE P. BOSWORTH, OF PAWTUCKET, RHODE ISLAND.

STOP-MOTION FOR SPOOLING-MACHINES.

SPECIFICATION forming part of Letters Patent No. 575,663, dated January 19, 1897.

Application filed April 6, 1893. Renewed February 4, 1895. Serial No. 537,306. (No model.)

*To all whom it may concern:*

Be it known that I, GEORGE P. BOSWORTH, a citizen of the United States, residing at Pawtucket, in the State of Rhode Island, have invented a new and useful Improvement in Stop-Motions for Spooling-Machines, of which the following is a specification.

My invention consists in the improved construction and arrangement of parts whereby the motion of the spool may be suddenly checked upon the breaking or failure of a thread, as hereinafter fully set forth.

Figure 1:
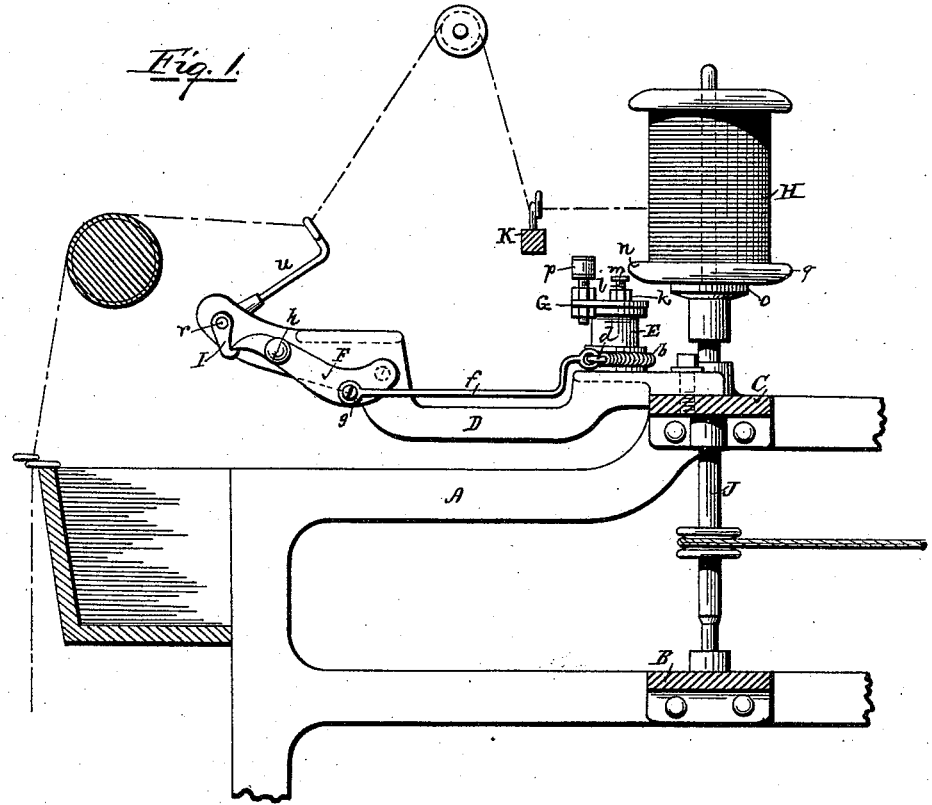
Figure 2:
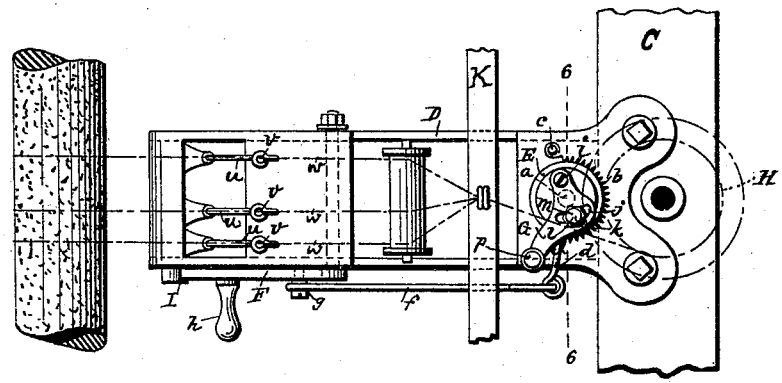
Figure 3:
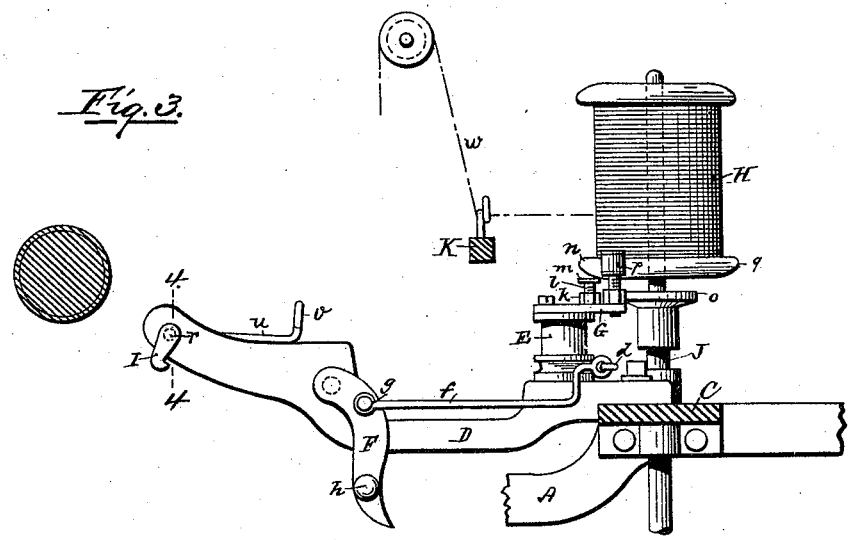
Figure 4:
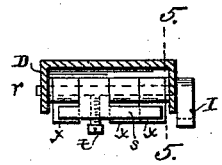
Figure 5:
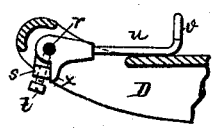
Figure 6:
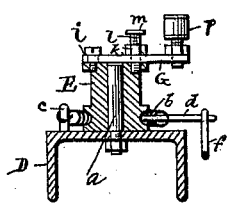

In the accompanying drawings, Figure 1 represents a side elevation of my improved stop-motion shown in its set position out of engagement with the spool. Fig. 2 represents a top view of the same. Fig. 3 represents a side elevation showing the stop-motion in its disengaged position. Fig. 4 represents a vertical section taken in the line 4 4 of Fig. 3. Fig. 5 represents a vertical section taken in the line 5 5 of Fig. 4. Fig. 6 represents a vertical section taken in the line 6 6 of Fig. 2.

In the drawings, A respresents the frame of the spooling-machine; B, the step-rail; C, the bolster-rail; J, the spindle, and K the traverse-bar. To the bolster-rail C is attached the frame D, which supports the stop-motion mechanism, the said frame being provided with an upright stud $a$, upon which is placed the loose sleeve E, which is operated to turn in one direction by means of the spiral spring $b$, the said spring being attached at one end to the post $c$, fixed in the frame D, and at the other end to the arm $d$, fixed in the side of the sleeve E, the said arm $d$ being jointed at its outer end to the connecting-rod $f$, which is also jointed at $g$ to the gravitating catch-lever F, which is provided with the hand-operated knob $h$. To the upper end of the sleeve E, at the screw $i$, is pivoted the arm G, which is made capable of adjustment by means of the slot $j$ in the arm G, and the holding-nut $k$ upon the screw-stud $l$, which is fixed in the end of the sleeve E, and the upper end of the screw-stud $l$ is provided with a head $m$, which, by contact with the rounded head $n$ of the spool H, serves to raise the same from its supporting-disk $o$, as shown in Fig. 3. The outer end of the arm G is provided with the friction-head $p$, made of rubber or other suitable material, adapted by pressure against the edge $q$ of the head $n$ of the spool to check the momentum of the same upon the disengagement of the gravitating catch-lever F from the latch I, and by means of the adjusting-slot $j$ the friction-head $p$ may be set for operation upon spools of different sizes.

The latch I is attached to the pivot-pin $r$, which is loosely supported in the frame D, and to the pin $r$ is attached the tripping-bar $s$ by means of the set-screw $t$, and to the said pin $r$ are also pivoted the drop-wires $u$ $u$ $u$, through the eyes $v$ of which the thread $w$ is made to pass to the spool H, the said drop-wires, when the thread is intact, being held in their elevated position, as shown in Fig. 1, and upon the breaking or failure of one of the threads $w$ the spur $x$ of the disengaged drop-wire, by striking against the tripping-bar $s$, will cause the disengagement of the gravitating catch-lever F from the latch I to cause the instantaneous stopping of the movement of the spool H without requiring the stopping of the spindle J, upon which the spool is supported, the said spool being first raised from the disk $o$ by means of the swinging movement of the head $m$, caused by the resilience of the spring $b$ or the weight of the catch-lever F, and then frictioned by the engagement of the head $p$ with the edge $q$ of the head $n$ of the spool.

The gravitating catch-lever F, as shown in the drawings, is made of sufficient weight to cause the turning movement of the sleeve E, so that the spring B may be dispensed with; but both of these means may be used conjointly to cause the turning of the said sleeve.

I claim as my invention—

1. In a stop-motion for spooling-machines, the combination of the upright sleeve, with the lifting-head attached to the sleeve and adapted by its forcible lateral contact with the rounded head of the spool to lift the spool from its seat, the friction-head carried by the sleeve, and adapted to act upon the edge of the elevated spool, and means for actuating the lifting and friction heads to engagement with the head of the spool substantially as described.

2. In a stop-motion for spooling-machines, the combination of the upright sleeve, with the lifting-head attached to the sleeve and adapted by its contact with the rounded head of the spool to lift the spool from its seat, the adjustable arm carried by the sleeve and provided with a friction-head adapted to act upon the edge of the spool, and the drop-lever connected with the sleeve to rotate the same on the breakage of the thread, substantially as described.

GEORGE P. BOSWORTH.

Witnesses:
SOCRATES SCHOLFIELD,
JAMES W. BEUMAN.